Oct. 22, 1940.  E. R. NE PAGE  2,218,828

METHOD OF PRODUCING PHOTOGRAPHIC TRANSPARENCIES

Filed Aug. 8, 1938

INVENTOR.
Ervin R. Ne Page
BY Robert L. Rockwell
ATTORNEY.

Patented Oct. 22, 1940

2,218,828

UNITED STATES PATENT OFFICE 2,218,828

METHOD OF PRODUCING PHOTOGRAPHIC TRANSPARENCIES

Ervin R. Ne Page, Seattle, Wash.

Application August 8, 1938, Serial No. 223,677

3 Claims. (Cl. 41—21)

This invention relates in general to new and useful improvements in the art of color photography, and in particular to an improved method of producing colored photographic transparencies.

The preferred embodiment of the means for using my method, hereinafter disclosed, comprises a translucent picture of the subject, preferably colored on the developed chemical coating side thereof with photographic color paints applied in a special manner, disposed between a front pane of clear crystal glass and a rear light diffusing screen of what is known in the art of glass making as a pane of flashed opal glass, said front and rear panes of glass being held firmly against said picture to form a photographic transparency unit, and a light box having an open side adapted to receive said transparency unit and containing a source of artificial light. Said source of light may be a standard incandescent electric light, as illustrated in the drawing. No auxiliary light shields or special reflector surfaces are required.

When the picture of an art subject is prepared and illuminated from the rear in accordance with my method, the observer sees a picture having life-like coloring, clear definition, a realistic sense of depth and harmonious light and shadow effects throughout its entire area without perceiving the concentration of light emanating from its source, as heretofore has been the case. Furthermore I find that large colored photographic transparencies prepared in accordance with my method have clearer definition and cost much less than when the colors are photographed directly using present methods and materials.

An object of the invention is to provide an improved method of producing photographic transparencies that assure the uniform illumination of the picture from the rear by a source of artificial light.

Another object is to provide an improved method of producing photographic transparencies for imparting natural colors and the impression of depth to translucent pictures when illuminated from the rear by artificial light.

A further object is to provide an improved method of producing photographic transparencies of the kind described that is easy and inexpensive to use.

Other objects and advantages will be apparent to those skilled in the art, from the following detailed description of a preferred form of the means for executing the method of my invention, which consists of certain parts in cooperative combination as hereinafter described, illustrated in the accompanying drawing, and embraced in the appended claims.

Figure 2:
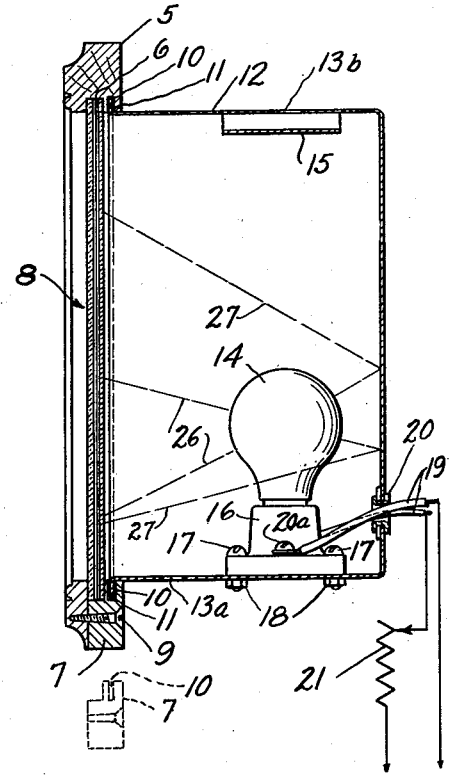
Fig. 2 is a sectional elevation of the assembly taken on broken line 2—2 of Fig. 1, showing in detail the relative arrangement of the several parts.

Like reference numerals are used to indicate like parts throughout the drawing, wherein 5 is a picture frame which may be of any design adapted to set off the picture to the best advantage, but preferably provided with grooves 6 in the two sides and top mitered elements of the frame, illustrated in Fig. 2, and provided, also with a notched lower element of the frame indicated by the numeral 7. The picture unit 8 is supported in said grooves and by the notched portion of element 7, which is held in position by means of screws 9 passing therethrough and secured to the forward portion of the frame, as will be seen at the bottom of said Fig. 2.

Other grooves 10 are provided in the two side members and top of the frame and in removable element 7 to receive the outwardly disposed flanged portions 11 of light box 12, preferably of metal. The shape of the light box I find to be relatively unimportant when used in connection with the method of my invention, but I prefer to provide the interior surfaces of the light box with a reflecting surface such as is obtained by applying one or more coats of so-called silver paint.

Holes 13a and 13b in the bottom and top walls respectively may be provided for the circulation of air through the light box to prevent the overheating of its interior due to the heat liberated by the source of light designated by the numeral 14. A U-shaped piece of metal 15 may be fixedly secured by brazing or welding to the inside surface of the top wall of the light box in a position adapted to prevent the escape of light, but to permit the circulation of air.

Light bulb 14 may be mounted in a standard receptacle 16 having a base composed of insulating material and provided with a lower flange portion having holes for the reception of screws 17, which pass also through suitable holes in the lower wall of the light box so nuts 18 may be used to fixedly secure said receptacle to said lower wall. Current is supplied to the receptacle, and in turn to the lamp, by means of insulated electrical conductors 19, which pass through a bushing of insulating material 20 and connect to the usual receptacle terminals 20a. Conductors 19 may be connected to any convenient source of electrical energy, not shown, of the proper voltage for the operation of the lamp.

A suitable variable resistance, shown diagrammatically at 21, may be connected in series in either of said conductors 19 for the purpose of varying the rate of current flow through the lamp, and thereby varying the character of the light emitted by the lamp, which in turn modifies the effect of the illumination transmitted through the picture unit from the light box to the observer.

It will be obvious to those skilled in the art that the portion of the picture directly opposite the lamp bulb heretofore has been illuminated much more brightly than any other portion of the picture. I have discovered, however, that when a picture transparency unit is produced by the method I am about to describe, the light is distributed substantially uniformly throughout the entire field of the picture, and the location of the source of light supplying the illumination in the light box cannot be discerned by an observer viewing the picture thus illuminated.

The picture transparency unit preferably is made up of three distinct portions. The first and most important of these, preferably is a translucent positive print 22 made from a negatively developed photographic film of the subject. The developed chemical coating of said print should be on the back side of the transparent base material and have a relatively rough surface in order to readily receive what is known in the art as photographic oil paint. Instead of a positive print, a positively developed photographic film may be used direct if desired. A positive print upon sensitized film material made from a negatively developed film is the preferred form of picture.

Figure 1:
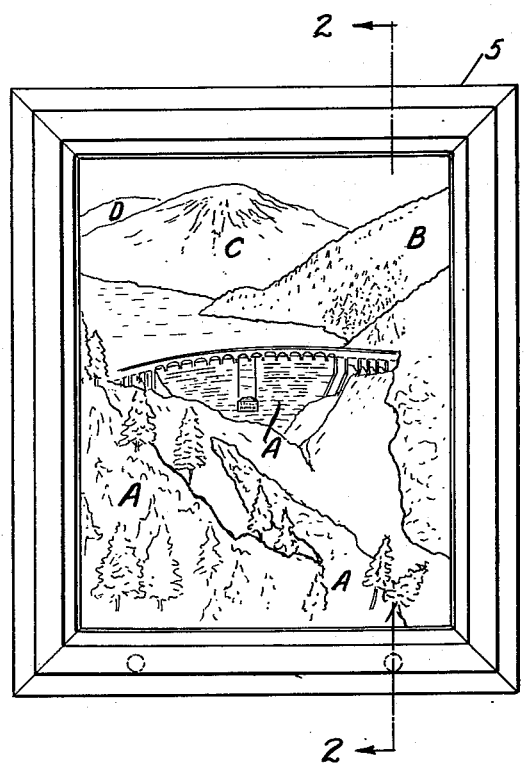
Fig. 1 is a front elevation of a picture in its frame used in connection with other elements of the combination, particularly the light box shown in Fig. 2.
Figure 3:
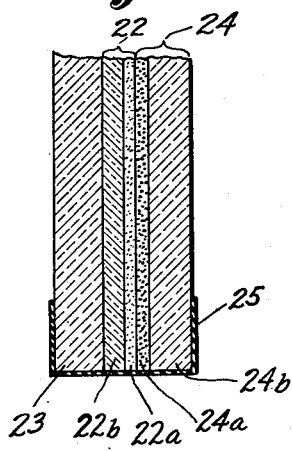
Fig. 3 is a fragmentary sectional elevation of what I term the picture transparency unit, taken on broken line 2—2 of Fig. 1 to a larger scale.
Figure 4:
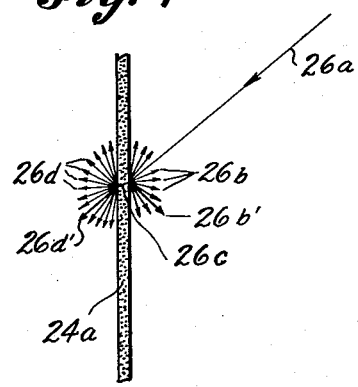
Fig. 4 is a diagram illustrating the diffusion of the light effected by means of a preferred flashed opal glass diffusing screen for the illumination of the picture by a course of artificial light.

When the photograph is taken a record is made of the colors of the various portions of the picture field. This may be done by means of notes, or an auxiliary photograph in colors may be made. From this record the artist applies his colors to said relatively rough surface of the print, taking care to use the more vivid shades of the colors required for those portions, such as A of the picture shown in Fig. 1 of the drawing that are in the foreground, and using the lighter shades thereof together with an admixture of pigments that will make the colors appear to be increasingly hazy for those portions, such as B, C and D, respectively, that are in the background. In Fig. 3, the chemical coating of the print is designated by numeral 22a, and the transparent portion thereof by numeral 22b.

After the paint is dried, said positive print is placed with its smooth side next to a pane of crystal glass 23 and a special light diffusing screen of flashed opal glass is placed on top thereof, preferably with the coating of opal 24a next to the chemical coating 22a of the print, the clear portion 24b of said flashed opal glass being on the outer side. All three elements of the picture transparency unit then are pressed firmly together so strips of adhesive tape may be applied to the edges to hold said parts firmly together, as indicated in Fig. 3.

With screws 9 and strip 7 removed, the picture unit may be inserted in grooves 6 of frame 5, after which removable strip 7 and screws 9 are replaced, thus firmly holding the picture unit in its frame before the open side of the light box, as will be seen in Fig. 2.

The artistry of the picture is enhanced considerably by providing wall space deep enough to receive the light box, thus permitting the frame and its picture to appear to be hung on the wall in the usual manner. With the device thus installed it will be apparent that the subject matter of the picture may be changed from time to time by the simple expedient of removing screws 9, which in this case may be made available from the front of the frame, and then slowly lowering removable strip 7 so that picture unit 8 will slide downwardly in grooves 6 in the side members of the frame until it may be grasped firmly by the hand, after which it then may be easily and safely removed from the frame and another inserted in its place with removable strip 7 again forced upwardly into position so screws 9 may be replaced.

When the light box is illuminated by lamp 14, it will be apparent to those skilled in the art that the light emanating from said lamp is partly transmitted to the flashed opal coating directly, and part of it is reflected by the several walls of the light box onto said coating as indicated by the faint lines representing rays of light numbered 26 and 27 respectively in Fig. 2. As these light rays impinge upon the flashed opal coating 24a, the impinging rays are highly diffused by the particles of materials, such as calcium fluoride, which permeate the medium forming therewith said opal coating. By diffusion is meant that the light rays, thus impinging on the particles composing the diffusing coating, do not follow a single path as when passing through ordinary clear crystal glass, but are reflected and transmitted in a great variety of directions, somewhat as indicated by the lines of the diagram shown in Fig. 3. In said diagram line 26a may be considered as a ray of light emanating from light source 14. It will be seen that said ray is indicated as being broken up into a large number of reflected and diffused components of light indicated by lines 26b and 26b'. These components of the reflected light may be considered as traversing the directions indicated by the several lines, and their lengths may be considered as indicative of the intensity of the light reflected in their several directions.

Similarly, line 26c indicates the component of light ray 26a that is transmitted through the opal coating, and which may be considered as broken up into a large number of component parts indicated by lines 26d and 26d' that likewise indicate the direction and intensity of the illumination transmitted through the opalescent film in their respective directions. It will be seen that reflected components 26b of light ray 26a are only slightly longer, and therefore indicate only slightly greater light intensity in their particular directions, as compared with component 26b'. In like manner components 26d of the transmitted component 26c differ even less from the component 26d'.

From the foregoing brief explanation of what I mean by the term diffusion, it will be understood that the multitude of light rays emanating from source 14 and impinging on opal coating 24a will in large part be reflected back into the light box in a great variety of directions, and that as these reflected components of light impinge upon the reflecting surfaces of the light box (because of the nature of the surfaces of said light box hereinbefore described), they again will be reflected and at the same time further diffused when they again impinge upon said opal coating. Hence, what was originally a ray of light having unitary direction, is seen to be broken up into a great number of component rays whose directions in striking on the opal coating may be considered to be infinite. It will be apparent that in view of the fact that only a portion of each ray, such as 26a, is transmitted through the opal coating, and in passing through said opal coating is highly diffused, it follows that all of the light passing through said coating will be diffused in a similar manner.

The foregoing information is not intended to be an exact explanation of the phenomenon of the diffusion of light transmitted through flashed opal glass, but is indicative of what I mean by specially diffused light, such as I make use of for the purpose of illuminating my painted translucent picture.

I find that the light derived from the opal coating of the flashed glass is further diffused by the pigment particles of the paint used in coloring said picture, as previously explained. Because of the nature of the specially diffused transmitted light employed, the entire field of the picture is so uniformly illuminated, that the location of the light source is not discerned by the observer. Furthermore, due to the absorption of a larger proportion of the shorter rays of light by the darker pigments used to color those portions of the picture which are in the background, said portions appear to be at a greater distance from the observer than those portions in the foreground that are not so treated, thereby imparting both color and the impression of depth to illuminated pictures obtained by single-lens photography.

Highlights and shadows are faithfully reproduced by my improved method without the necessity of varying the thickness of the paint used. I find that in order to reproduce the high-lights of the subject it is necessary only to color the various areas with the proper colored paint as previously described, providing the picture thus colored is illuminated by the specially diffused light transmitted through the flashed opal glass and the painted surface of the chemical coating of the translucent picture.

Good results may be obtained by using the flashed opal glass with the opal coating toward the source of light instead of next to the colored surface of said picture. I find, however, that the best results are obtained when the picture unit is made up as hereinbefore described, and as illustrated in Fig. 3.

By varying the amount of resistance 21 in series with the lamp, it will be apparent that the filament of the lamp will be heated to either a higher or lower temperature depending upon whether the resistance is decreased or increased in the circuit. By thus varying the temperature of the filament of the lamp, the range of wave lengths of the light produced by the lamp may be varied over a considerable range. It is well known that the diffusion characteristics of the layer of opal material varies greatly with the wave length of the light transmitted through it. Therefore, by varying the adjustment of variable resistance 21, the diffusion characteristics of the layer of opal material and the amount of light used may be varied until the picture appears to the best advantage.

By considerably increasing the amount of resistance in the circuit, the picture may be made to take on the characteristics of the subject as viewed at sunrise or at sunset, and by increasing the resistance still further it may be made to appear as if viewed by moonlight.

From the foregoing it will be clear that my improved method of imparting color and the impression of depth to pictures comprises the following steps:

1. Preparing a translucent picture of the subject obtained by single lens photography.
2. Coloring the several portions of the picture on the surface of the chemical coating of the film to conform to the various colors of the subject, and preferably progressively adding a suitable pigment to the paint used in coloring the respective progressively arranged background portions of the picture.
3. Illuminating the picture thus colored by means of transmitted light, highly diffused, such as is obtained by means of a pane of flashed opal glass interposed between said picture and a source of light, preferably of variable intensity, and inclosed in a suitable light box.

Intermediate of the aforesaid steps 2 and 3 may be inserted an additional step, which consists of forming a picture unit comprising a pane of clear or crystal glass placed on the front or smooth side of the positive film print, and a pane of flashed opal glass disposed at the rear of the film print, the three elements of the unit thus formed being pressed firmly together and then fastened in any suitable manner at their edges.

While I have disclosed one preferred means of carrying out the aforesaid method, it will be understood that various modifications may be made in the instrumentalities thus employed, without departing from the spirit and intent of the invention embraced in the appended claims.

Having described my invention, what I claim as new and desire to protect by Letters Patent is:

1. The method of producing photographic transparencies to secure a uniform illumination of the picture from the rear by a source of artificial light, which consists of making a translucent photographic picture comprising a flexible front transparent base and a developed rear chemical coating, placing said picture between a front pane of clear glass and a special light diffusing screen of a rear pane of flashed opal glass, and fixedly securing said panes of glass against the intervening said picture.

2. The method of producing photographic transparencies to secure the uniform illumination of the picture from the rear by a source of artificial light, which consists of making a translucent photographic picture comprising a front transparent flexible base and a developed rear chemical coating, placing said picture between a front pane of clear glass and a special light diffusing screen of a rear pane of flashed opal glass with the flashed side thereof adjacent said developed chemical coating, and fixedly securing said panes of glass against the intervening said picture.

3. The method of producing colored photographic transparencies for imparting natural colors and the impression of depth to translucent pictures when illuminated from the rear by artifical light, which consists of making a translucent photographic picture by single lens photography, said picture comprising a front flexible transparent base and a developed rear chemical coating, painting the foreground portions of said chemical coating with oil color paints and painting the progressive background portions thereof with oil color paints to which suitable pigments have been added progressively in keeping with the progressive haziness of said background portions of the picture, placing the thus painted said picture between a front pane of clear glass and a special light diffusing screen of a pane of flashed opal glass, and fixedly securing said panes of glass against the intervening said picture.

ERVIN R. NE PAGE.